United States Patent Office 3,349,768
Patented Oct. 31, 1967

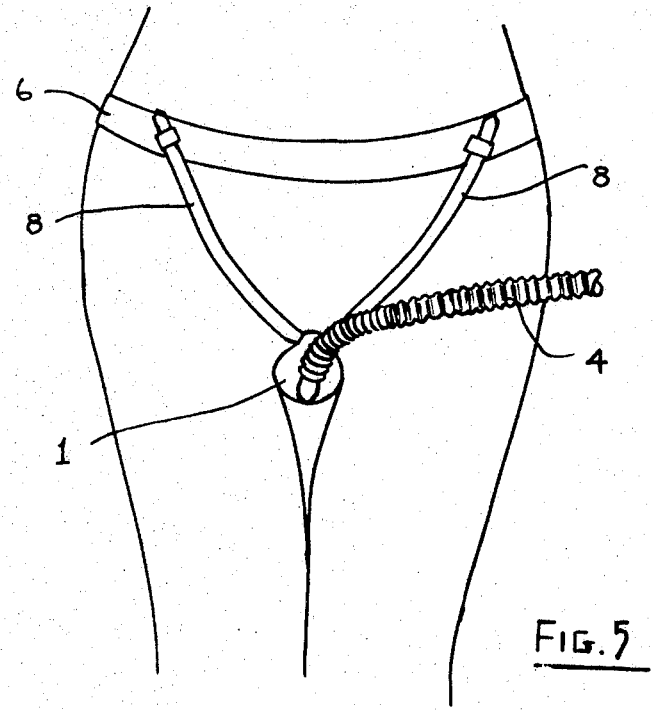
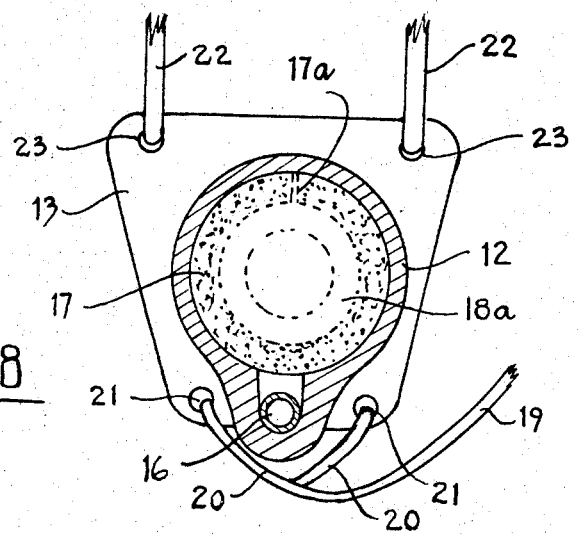

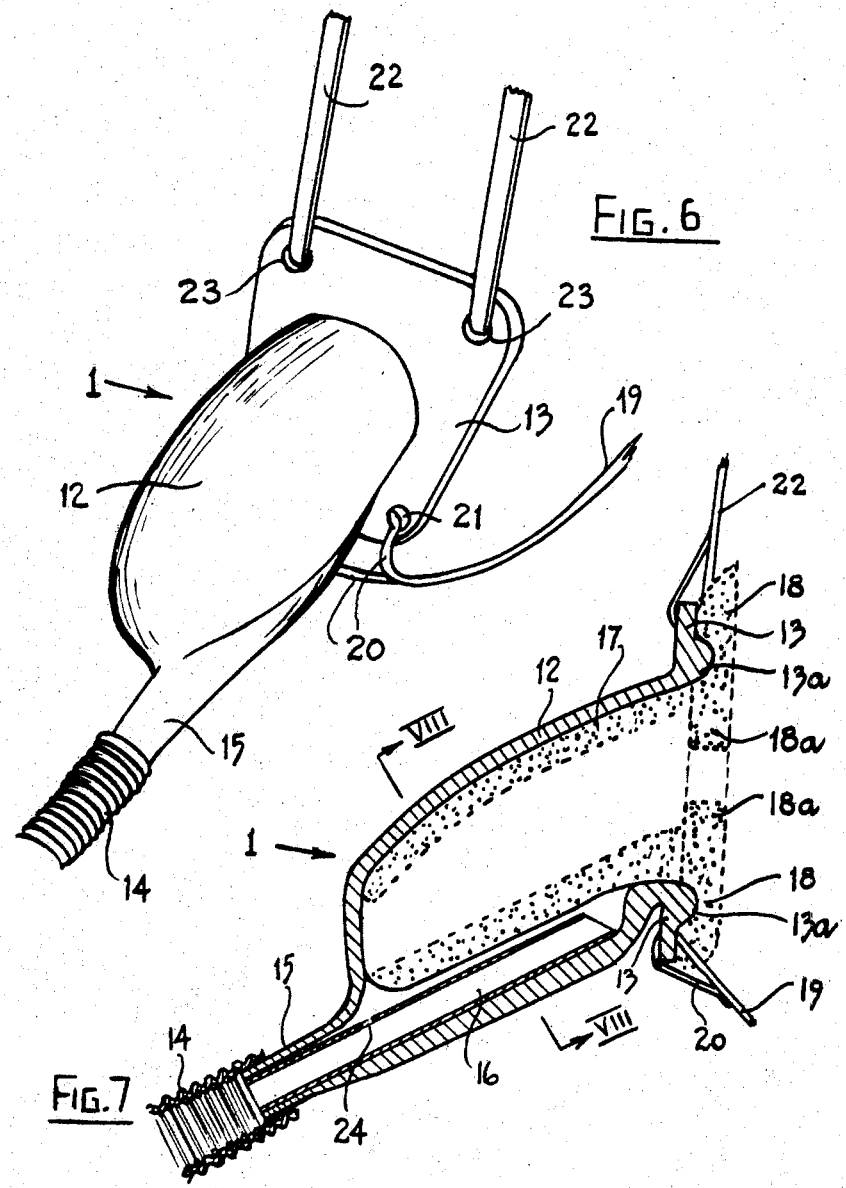

3,349,768
PORTABLE URINAL PROVIDED WITH SUCTION MEANS FOR USE IN MICTURITION
Francis Xavier Keane, 216 N. Circular Road, Dublin, Ireland
Filed Feb. 7, 1966, Ser. No. 534,598
Claims priority, application Ireland, Feb. 16, 1965, 165/65
13 Claims. (Cl. 128—276)

ABSTRACT OF THE DISCLOSURE

A suction evacuated urinal which is shaped to provide full tissue support for the external genitalia when positioned in contact therewith.

---

This is a continuation-in-part of my copending application Ser. No. 397,372, filed Sept. 18, 1964 now abandoned.

This invention relates to portable apparatus for use in micturition, and more particularly to an apparatus adapted for collecting and conveying urine and other discharges from the region of the external genitalia.

It is a primary object of the invention to provide such an apparatus which may be adapted to individual requirements and which may be applied to a person in a simple and reliable manner for use in any posture. The apparatus is suitable for use with patients in a reclining or horizontal posture in bed, with wheel-chair patients, or ambulant and the like cases. Use of such an apparatus will not only reduce very considerably the amount of nursing care which such patients require but also contributes to the comfort of individual patients.

With this object in view, the invention comprises a suction head shaped for releasable positioning in contact with female or male external genitalia, inlet means in the suction head for receiving any discharge from the genitalia, a suction head outlet in communication with the inlet means, and a length of non-collapsible, flexible tubing connecting the suction head outlet to a source of partial vacuum.

The invention will be more clearly understood from the following description of certain embodiments thereof given by way of example only, with reference to the accompanying drawing in which:

FIG. 5 is a front view of FIG. 4;

FIG. 6 is a perspective view of the apparatus for male use;

FIG. 7 is a central longitudinal sectional view of FIG. 6;

FIG. 8 is a cross-sectional view taken on the line VIII—VIII of FIG. 7;

Figure 1:
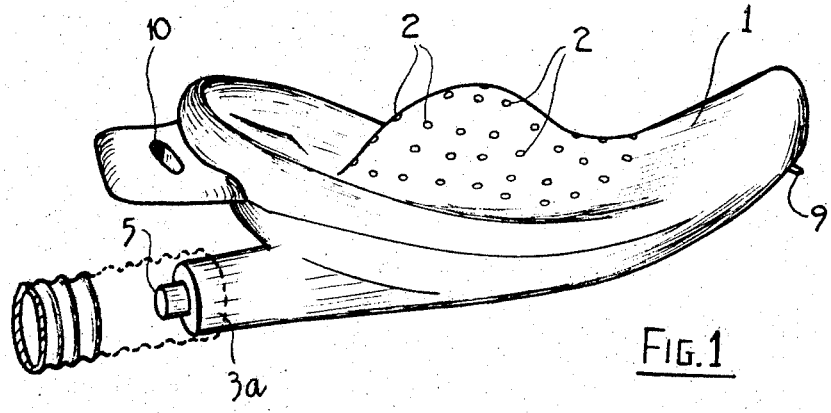
FIG. 1 is a perspective view of an embodiment of the apparatus for female use.
Figure 2:
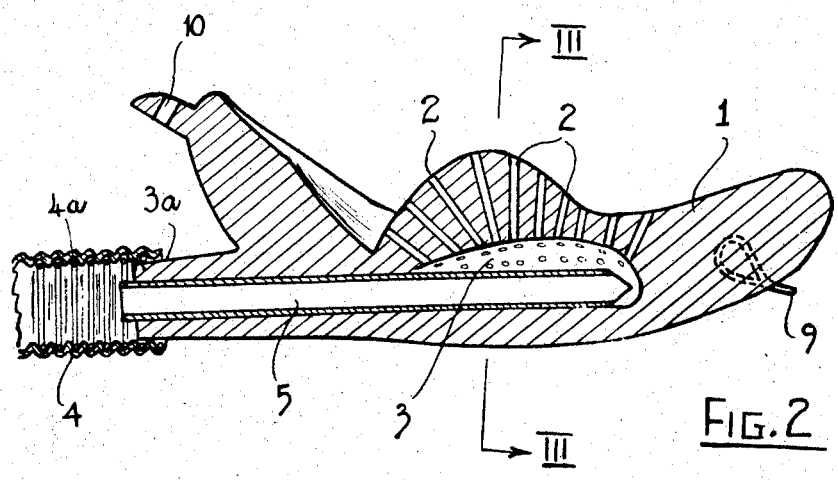
FIG. 2 is a central longitudinal sectional view of FIG. 1.
Figure 3:
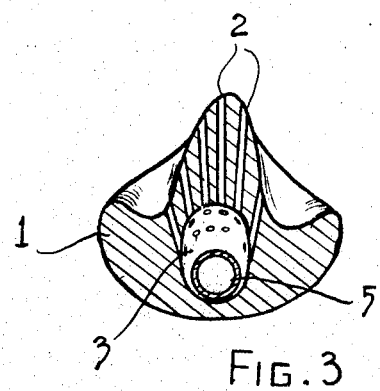
FIG. 3 is a cross sectional view taken on the line III—III of FIG. 2.
Figure 4:
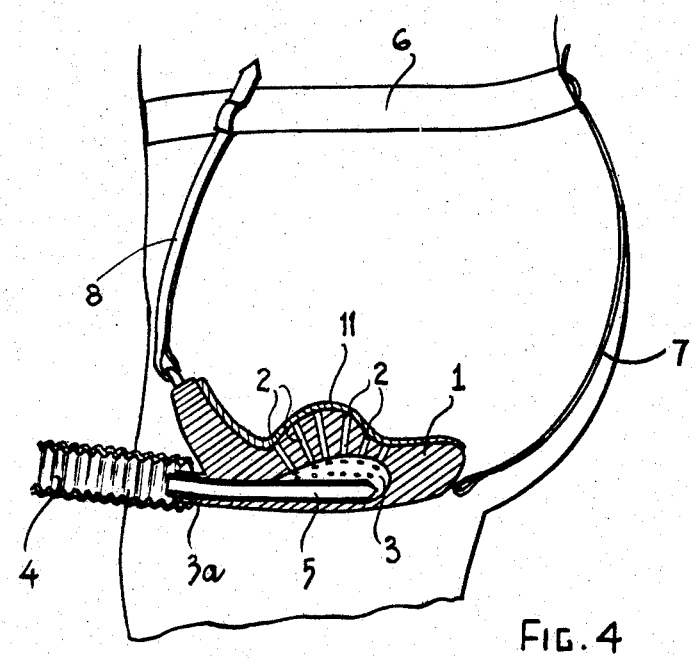
FIG. 4 is a partial sectional view showing the apparatus of FIGS. 1–3 in the position of use.

Referring to FIGS. 1 to 5, the apparatus is shown to comprise a suction head 1 being shaped as a modified cast of the external female genitalia. The suction head is made of a semi-rigid, non-irritant material, such as rubber, thermoplastic or the like. The suction head 1 is provided with a plurality of ducts 2 constituting inlet means from the surface of the suction head 1, which is in contacting apposition to the external genital organs (the vestibule of the vagina, the vaginal opening, the vestibular fossa, the posterior commissure, and the medial surfaces of the labia), to a central cavity 3 in communication with an outlet 3a at the anterior end of the suction head. One end of a length of corrugated, non-collapsible, flexible tubing 4 is connected to the outlet, and the tubing leads to a urine container (not shown) which is subjected to a gentle partial vacuum by means of a suitable suction pump.

The tubing 4 is preferably of the corrugated plastic type which is reinforced with an internal helix of nylon 4a, since such tubing is not only non-kinkable and strong, but is very light in weight and permits of resilient extension and contraction in the longitudinal direction whereby movement of the wearer is less likely to cause displacement of the suction head during use.

A suction tube 5 extends from outlet 3a, into the cavity 3 at the bottom portion thereof in the position of use. Tube 5 terminates close to the posterior end of the cavity 3, the end of the tube 5 being bevelled or otherwise shaped to prevent any possibility of the end of the tube being closed against the wall of the cavity 3. It will be appreciated that, in use, any urine passed will drain through the ducts 2 towards the posterior end of the cavity 3, such direction of drainage being enhanced if the wearer is in a reclining position in bed, and direct application of the vacuum through the tube 5 to the posterior end of the cavity 3 will serve to discharge any urine accumulating there quickly. Otherwise, a tendency towards leakage at the posterior end of the suction head 1 might arise between the inner contacting surface of the suction head and the person.

The suction head 1 is held and maintained in position not only by virtue of its shape and the vacuum applied to its internal surface but also by means of a posterior elastic strap 7 and two anterior elastic straps 8 adjustably anchored to a waistbelt 6.

Preferably, the anterior straps 8 extend in an inclined antero-lateral direction in such a manner that they do not exert pressure on the anterior superior spine of the ilium, and the innermost ends of the straps 7 and 8 are either cast into the suction head 1 as a unit or are removably attached to a cast-in anchor ring 9 and to a strap opening 10 provided at the posterior and anterior ends of the suction head 1 respectively.

If desired, a layer 11 (see FIG. 4) of absorbent open-cell porous material, such as foam plastic, may be interposed between the innermost contacting surface of the suction head 1 and the external genitalia to maintain uniformity of discharge and to assist prevention of leakage. The layer 11 which is approximately ¼ inch thick will also serve to support the tissues of the genitalia and prevent them from being sucked into the openings of the ducts 2. It will also reduce the possibility of contact dermatitis.

In the apparatus for male use illustrated in FIGS. 6, 7 and 8, the suction head 1' has the shape of a sheath 12 having an integral outwardly extending flange 13 at its inner open end, and an integral outlet socket 15 at its outer end, socket 15 being adapted for connection to the exterior length of non-collapsible flexible tubing 14 (similar to the tubing 4 of FIG. 2) and also adapted for the connection to the interior thereof of a length of tubing 16 extending along the interior of the sheath 12 at the bottom portion thereof in the position of use. The tubing 16 preferably extends close to the innermost end of the sheath 12, as shown.

As in the case of the suction head 1 of FIGS. 1 to 5, the sheath 12 and suction tube 16 may be of semi-rigid composition, such as rubber, thermoplastic or the like maerial, and the flexible tubing 14 is led to the urine container (not shown) which is subjected to a gentle partial vacuum.

Preferably, the internal size of the sheath 12 is adapted to accommodate therein an internal sheath 17 of absorbent open-cell porous material such as foam plastic, having an integral flange extending outwardly at 18 and inwardly at 18a for direct application to the person, in which position the porous material is interposed between the flange 13 and the person. As will be more apparent from FIG. 8, the longitudinal seam 17a of the sheath 17 may be left open for adjustability.

The inward extension 18a of the porous material serves as an end stop having close contact with the penis and thereby assists in preventing any leakage of urine in the posterior direction. For the same reason, the flange 13 is preferably provided with an annular protuberance 13a, enhancing close contact of the porous material flange 18, 18a with the person.

As in the case of the female suction head 1, the male suction head 1' is held and maintained in position not only by its shape and by the vacuum applied to its internal surface but also by a lightweight adjustable harness which conveniently comprises an elastic strip 19 connected at its innermost end to a flexible loop member 20 threaded through a pair of strap openings 21 provided at the bottom portion of flange 13. The strap 19 is passed between the legs and led up the back of the person where it is connected to the V-junction of a pair of similar straps 22 which are passed over the shoulders and led downwardly and secured to a pair of strap openings 23 provided at the top portion of flange 13. Obviously the ends of the straps 19 and 22 may be formed integral with the flange 13 during the molding of the latter, and the overall length of the harness straps may be rendered adjustable by known clasp or like means.

It will be apparent that when the suction head of FIGS. 6 to 8 is in use upon a male reclining in bed, any urine passed will tend to drain to the innermost bottom portion of the sheath 12, and it is for this reason that the interior suction tube 16 is led to this position for rapid extraction.

When, however, the wearer occupies a sitting position, the tendency of urine drainage will be towards the outermost end of the sheath 12 in promixity to the outlet socket 15, and to facilitate the extraction of the urine and prevent accumulation thereof, the upper portion of the wall of the tube 16 may be provided with a small aperture 24.

Figure 9:
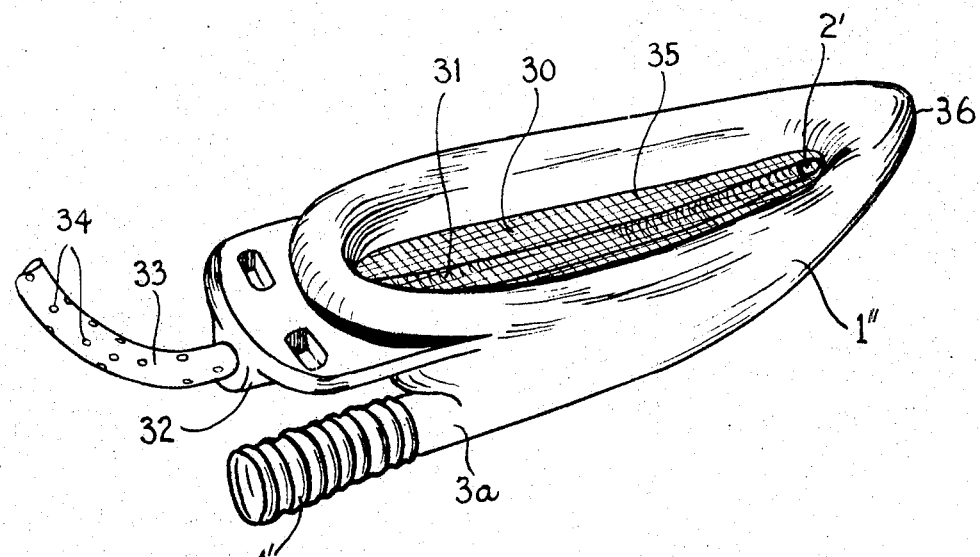
FIG. 9 is a view similar to that of FIG. 1 of an improved embodiment.
Figure 10:
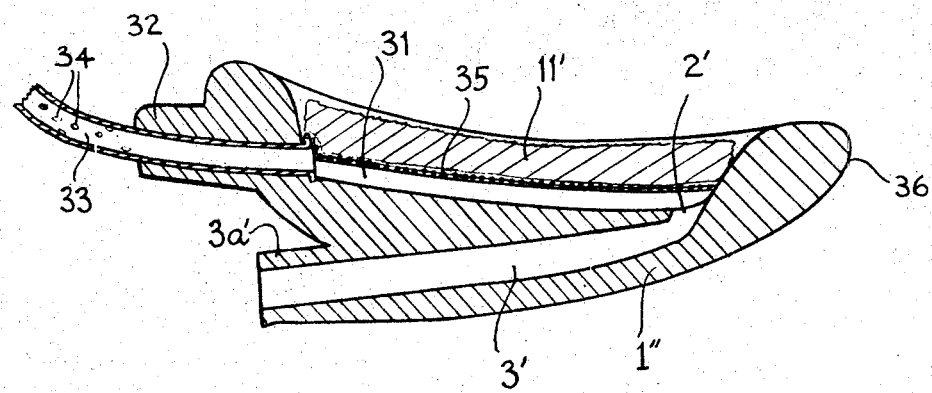
FIG. 10 is a central longitudinal section of FIG. 9 but also showing a pad of porous material positioned for contact with the genitalia.

The improved embodiment of FIGS. 9 and 10 incorporates vacuum controlling breather pipe means adapted to ensure entrance of a requisite volume of fresh air to the suction head at all times to maintain and regulate the desired partial vacuum therein, whereby a higher partial vacuum may be applied to the urine container and thence to the flexible tubing with greater safety and also providing constant veltilation of the suction head.

The thus created air flow through the suction head also operates to sweep or displace fluid therefrom and thereby to obviate any gurgling noise which might otherwise arise if fluid residue remained in the suction head.

As shown, the suction head 1" is provided with a hollowed-out portion 30 from the rear end of which an inlet duct 2' leads to a cavity 3' in communication with an outlet 3a' adapted for connection by a length of non-collapsible flexible tubing 4' to a urine container (not shown) which is subjected to a gentle partial vacuum.

The base of the hollowed-out portion 30 is formed with a urine receiving channel 31 leading at one end to a socket 32 communicating directly with the hollowed-out portion 30, socket 32 being connected to a vacuum controlling breather pipe 33 having perforations 34 in the wall thereof, the breather pipe 33 being open to the atmosphere at its free end. At its other end the channel 31 communicates directly with the inlet duct 2.

The hollowed-out portion 30 is fitted with a removable shaped pad 11' (see FIG. 10) of absorbent open-cell porous material which makes direct contact with the external genitalia and through which the gentle partial vacuum is applied thereto. Beneath the pad 11' and resting directly on the hollowed-out portion 30 there is preferably positioned a removable mesh insert 35 of stainless steel or of rigid plastic material which is cut to the same shape as that of the pad 11' and operates to support the pad 11' which, in turn, supports the patient's tissues against expansion into the hollowed-out portion 30 under the action of the partial vacuum, and also prevents pad 11' from sinking into the channel 31 or the duct 2', thus obstructing air entry to the cavity and the application of the vacuum. The mesh insert 35 also operates to impart rigidity to the suction head and, being removable, is readily cleaned.

It will be apparent that since the vacuum controlling breather pipe 33, having a constant length and bore, is in communication with the interior side of the pad 11' and with the common cavity 3' through the duct 2', the evacuation of a fixed volume of air per minute from the apparatus through tube 4' will result in a predetermined partial vacuum being maintained in the apparatus, and hence on the patient's tissues and within the preferable limits of 3 to 6 inches of water. When urine is passed, it tends to block the passage of air from the atmosphere through channel 31 to the cavity 3', causing a rise of vacuum in the cavity 3' and tubing 4', which operates to remove urine quickly while the low partial vacuum is maintained in the hollowed-out portion 30. In consequence, a potentially controlled higher vacuum may be applied with safety to the urine container than could be applied if the apparatus were not equipped with the breather pipe arrangement.

In the case of the apparatus for male use, it will be obvious that for the purpose of limiting the applied vacuum, it is merely necessary to allow the suction tube to have access to the exterior through a vacuum controlling breather pipe.

Apart from its primary function of limiting the applied vacuum, the provision of the breather pipe 33 enables a gentle current of air to be drawn through the apparatus when urine is not being passed, whereby a hygienic ventilation effect is attained to remove by evaporation residual moisture in the apparatus.

The present apparatus can obviously be used by the male wearer in the standing position to serve as a urinal without the application of any vacuum, being connected to any simple container for this purpose, and being re-connected to the vacuum when the wearer changes to a recumbent or sitting posture, whereby freedom of movement is allowed.

Tubing 4' may be connected to the suction head at the front or rear thereof to communicate directly with the inlet channel 31. Similarly the breather pipe 33 may be connected with the channel 31 through the posterior wall 36 of the suction head 1", or led down the channel 31 to the end thereof opposite to that of the entry of the breather pipe into the suction head. It is only necessary to ensure that the air admitted to the breather pipe 33 traverses the channel 31.

The cross-section of the channel 31, of which there may be more than one, is adapted to accommodate a volume of urine flow through the channel together with the volume of air passing through which will be adequate in all cases, so that rapid removal of urine is ensured irrespective of the posture of the patient.

Since it is usual in hospitals to have a piped vacuum supply to all wards, the apparatus according to the invention can be used in conjunction with such piped vacuum supply by providing a reducing valve in series with the air line leading from the urine container to the vacuum pipe.

While the apparatus according to the invention has been described in relation to the passage of urine, it will, of course, be understood that the apparatus is equally adapted to receive and extract higher viscosity discharges, as in menstruation.

I claim:

1. Portable apparatus for collecting and conveying urine and other discharges from the region of the external genitalia, a layer of an absorbent, open-cell, porous material interposed between the suction head and the external genitalia, comprising a suction head shaped for releasable positioning in contact with the external genitalia, inlet means in the suction head for receiving any discharge from the genitalia, an outlet in the suction head in communication with the inlet means, and a length of non-collapsible, flexible tubing connected to the outlet for connecting the same to a source of partial vacuum.

2. Portable apparatus as defined in claim 1, wherein the suction head has a surface shaped to contact female external genitalia, and said absorbent material layer is positioned on said suction head surface.

3. Portable apparatus as defined in claim 1, wherein the suction head includes a sheath shaped to accommodate a penis, an open end of the sheath having an outwardly extending flange, the suction head outlet being at the opposite end of the sheath, and the absorbent material layer lining said sheath and said outwardly extending flange.

4. Portable apparatus as defined in claim 3, wherein the absorbent material layer lining the flange extends inwardly of the flange to define a constricted opening in the sheath.

5. Portable apparatus as defined in claim 1, wherein the suction head defines a cavity in communication with the inlet means and the outlet, the cavity having an elongated bottom portion, and a length of tubing is positioned in said bottom portion with one end connected to the outlet and another end opening into an end of the elongated bottom portion remote from the outlet.

6. Portable apparatus as defined in claim 5, wherein the tubing has a drainage aperture in communication with the cavity.

7. In a portable apparatus for collecting and conveying urine and other discharges from the region of the external genitalia, comprising a suction means for releasable positioning adjacent the external genitalia, inlet means in the suction means for receiving any discharge from the genitalia, an outlet in the suction means in communication with the inlet means, and a length of non-collapsible, flexible tubing connected to the outlet for connecting the same to a source of partial vacuum, the improvement of a suction head enclosing the suction means and having a wall shaped to provide full genitalia tissue support when in contact position with the genitalia.

8. Portable apparatus for collecting and conveying urine and other discharges from the region of the external female genitalia, comprising a suction head shaped for releasable positioning in contact with the genitalia, the suction head having a wall shaped to contact the genitalia; a plurality of inlet ducts in the wall of the suction head for receiving any discharge from the genitalia; an outlet in the suction head in communication with the inlet ducts, the suction head defining a central cavity in communication with the ducts and the outlet; and a length of non-collapsible, flexible tubing connected to the outlet for connecting the same to a source of partial vacuum.

9. Portable apparatus as defined in claim 8, further comprising breather inlet means in communication with the atmosphere and the interior of the suction head.

10. Portable apparatus as defined in claim 9, wherein the suction head comprises a channelled-out urine receiving portion communicating at one end with the outlet and at the other end with the breather inlet means, and further comprising an absorbent, open-cell, porous material pad positioned over the urine receiving portion.

11. Portable apparatus as defined in claim 10, further comprising a removable mesh insert of rigid material covering the urine receiving portion and supporting the absorbent pad.

12. Portable apparatus as defined in claim 9, wherein the breather inlet means comprises a perforated pipe open to the atmosphere and having one end in communication with the interior of the suction head.

13. Portable apparatus as defined in claim 9, wherein the suction head comprises a channelled-out urine receiving portion, the suction head defines a bore below the urine receiving portion, the bore leading from one end of the urine receiving portion to the outlet, and the other end of the urine receiving portion communicating with the breather inlet means.

References Cited
UNITED STATES PATENTS

| | | | |
|---|---|---|---|
| 2,365,296 | 12/1944 | Schimpf | 128—129 |
| 2,557,345 | 12/1951 | McEwen | 128—294 |
| 2,944,551 | 7/1960 | Breer | 128—295 |
| 2,968,046 | 1/1961 | Duke | 128—295 |
| 3,114,916 | 12/1963 | Hadley | 4—110 |

RICHARD A. GAUDET, *Primary Examiner.*

C. F. ROSENBAUM, *Examiner.*